(12) United States Patent
Murayama

(10) Patent No.: US 7,097,733 B2
(45) Date of Patent: Aug. 29, 2006

(54) METHOD OF BONDING ENDS OF FLAME RETARDANT SHEET AND INTERMEDIATE TRANSFER MEMBER OF IMAGE FORMING APPARATUS FABRICATED BY THE METHOD

(75) Inventor: Masato Murayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 10/917,837

(22) Filed: Aug. 13, 2004

(65) Prior Publication Data

US 2005/0061433 A1    Mar. 24, 2005

(30) Foreign Application Priority Data

Sep. 2, 2003  (JP)  ............................ P2003-309602
Sep. 2, 2003  (JP)  ............................ P2003-309603

(51) Int. Cl.
B32B 31/26      (2006.01)
G03G 15/16      (2006.01)
(52) U.S. Cl. .................. 156/304.3; 156/137; 156/304.6
(58) Field of Classification Search ..................... None
See application file for complete search history.

(56) References Cited

U.S. PATENT DOCUMENTS 4,511,622 A * 4/1985 Seimiya et al. ............. 428/323

FOREIGN PATENT DOCUMENTS

JP       11-282260       10/1999
JP       11282260 A  *  10/1999

* cited by examiner

*Primary Examiner*—Sam Chuan Yao
(74) *Attorney, Agent, or Firm*—Hogan & Hartson LLP

(57) ABSTRACT

There is prepared at least one flame retardant sheet member in which a flame retardant layer comprised of a flame retardant agent having extinguishability is sandwiched between resinous layers. One end face of the at least one sheet member and another end face of the at least one sheet member are opposed to each other while forming a clearance therebetween. A first welding member having a first width larger than a width of the clearance is placed on one face of the sheet member. The first welding member is welded with the end faces of the at least one sheet member such that the first welding member is melted and pushed into the clearance while the flame retardant agent situated in the vicinity of the end faces is pushed out from the clearance, thereby forming a joint portion. A second welding member having a second width larger than the first width is placed on the joint portion. The second welding member is welded with the at least one sheet member.

9 Claims, 8 Drawing Sheets

METHOD OF BONDING ENDS OF FLAME RETARDANT SHEET AND INTERMEDIATE TRANSFER MEMBER OF IMAGE FORMING APPARATUS FABRICATED BY THE METHOD

BACKGROUND OF THE INVENTION

The present invention relates to a method of bonding end portions of a flame retardant sheet consisting of a flame retardant layer sandwiched between resinous layers, the flame retardant layer being made of a flame retardant agent having extinguishability.

The invention also relates to a method of fabricating an intermediate transfer member by making use of the above-described bonding method, the medium being used in an image forming apparatus for forming an image using an electrophotographic technique such as a printer, facsimile machine, copier, or the like.

Generally, an image forming apparatus using an electrophotographic technique comprises: an image carrier having a photosensitive layer on its outer surface; a charger for uniformly charging the outer surface of the image carrier; an exposer for selectively exposing the outer surface uniformly charged by the charger to form an electrostatic latent image; a developer for applying toner (developer agent) to the electrostatic latent image formed by the exposer to thereby form a visible toner image, and a transferer for transferring the toner image developed by the developer to a recording medium such as paper.

An intermediate transfer member such as an intermediate transfer belt is known as the transferee. In particular, a toner image formed on the image carrier is transferred (primary transfer) and is further transferred (secondary transfer) to the recording medium.

Japanese Patent Publication No. 11-282260A discloses an intermediate transfer member formed in an endless manner. Specifically, a substrate sheet made of a resin is prepared, a conductive layer and a resistive layer are formed on one surface of the substrate sheet. End faces of the substrate sheet are placed opposite to each other with a space between them. A welding member is inserted into the space and abutted against the respective end faces. The welding member is melted using a welding tool such as an ultrasonic hone to weld together the end faces of the sheet.

In spite of the fact that a high-voltage transfer bias is applied to the intermediate transfer member, it is flammable because the substrate sheet is made of a resin. The above intermediate transfer member has only a flame retardant class of less than UL 94 VTM-2.

Therefore, in the past, when the intermediate transfer member is mounted in an image forming apparatus, the whole intermediate transfer member is covered by a cover having non-flammability. Accordingly, a large mounting space is necessary.

On the other hand, a sheet having a flame retardant layer having extinguishability (having the property of depriving oxygen) and sandwiched between resinous layers is known. Accordingly, if this sheet can be used as the substrate sheet of the intermediate transfer member, a flame retardant intermediate transfer member can be obtained. However, a flame retardant agent having extinguishability has no adhesiveness.

For this reason, an endless intermediate transfer member cannot be obtained by the method described in the above publication because the flame retardant agent around the joint hinders welding between the resinous layers, thus deteriorating the bonding strength.

SUMMARY OF THE INVENTION

It is therefore an object of the invention to provide a method of fabricating an endless intermediate transfer member of an image forming apparatus by using a substrate sheet in which a flame retardant layer having extinguishability is sandwiched by resinous layers.

In order to achieve the above object, according to the invention, there is provided a method of fabricating an endless intermediate transfer member incorporated in an image forming member such that a toner image developed on an image carrier is temporarily transferred thereon, the method comprising steps of:

preparing a substrate sheet in which a flame retardant layer comprised of a flame retardant agent having extinguishability is sandwiched between resinous layers;

laminating a conductive layer on a first face of the substrate sheet, and laminating a resistive layer on the conductive layer to form a sheet member;

opposing both end face of the sheet member while forming a clearance therebetween;

placing a first welding member having a first width larger than a width of the clearance, on a second face of the substrate sheet; and welding the first welding member with the end faces of the sheet member such that the first welding member is melted and pushed into the clearance while the flame retardant agent situated in the vicinity of the end faces is pushed out from the clearance, thereby forming a joint portion.

With this configuration, an endless intermediate transfer member including the substrate sheet having the flame retardant layer sandwiched between the resinous layers is obtained. That is, a nonflammable endless intermediate transfer member is obtained.

Therefore, the intermediate transfer member is not required to be covered by a non-flammable cover. The installation space in the image forming apparatus can be reduced accordingly. Consequently, the whole image forming apparatus can be reduced in size.

It may also be possible that a conductive material is kneaded with a non-flammable material (e.g., polyimide) such that an electrically uniform resistor is formed and that an intermediate transfer member is fabricated from this resistor. However, in this case, not only the cost of the materials increases, but also the bending resistance decreases. Therefore, the operation durability of this intermediate transfer member is poor. On the other hand, in a case where a material such as silicone rubber is used, greater peripheral length variations occur due to fluctuations of load applied thereto. As a result, the obtained image will be shifted from the desired position. With the configuration of the invention, such problems will not be occurred.

In contrast, in the present invention, such problems do not take place.

Furthermore, where the first welding process is performed using a welding tool rounded at least at its both end portions, the flame retardant agent in the vicinities of the end portions is pushed out smoothly. In consequence, a more firmly bonded state is obtained.

Preferably, the welding of the first welding member is performed by a welding tool having an abutment face which is abutted against the first welding member, and at least an edge portion of the abutment face is chamfered.

Preferably, the fabricating method further comprises steps of: placing a second welding member having a second width larger than the first width, on the joint portion; and welding the second welding member with the substrate sheet.

Here, it is preferable that the fabricating method further comprises a step of removing a portion pushed out from the clearance, before the second welding member is placed.

It is also preferable that the welding of the second welding member is performed by a welding tool configured to suppress a height of the second welding member melted and situated on the second face of the sheet member.

Preferably, the flame retardant agent is a bromine-based agent.

Preferably, the second face of the substrate sheet member is to be an inner face of the endless intermediate transfer member. According to the invention, there is also provided a method of bonding ends of at least one flame retardant sheet member, comprising steps of:

preparing at least one flame retardant sheet member in which a flame retardant layer comprised of a flame retardant agent having extinguishability is sandwiched between resinous layers;

opposing one end face of the at least one sheet member and another end face of the at least one sheet member, while forming a clearance therebetween;

placing a first welding member having a first width larger than a width of the clearance, on one face of the sheet member;

welding the first welding member with the end faces of the at least one sheet member such that the first welding member is melted and pushed into the clearance while the flame retardant agent situated in the vicinity of the end faces is pushed out from the clearance, thereby forming a joint portion;

placing a second welding member having a second width larger than the first width, on the joint portion; and welding the second welding member with the at least one sheet member.

With this configuration, the end faces of the at least one flame retardant sheet member are bonded together by the first welding member and the resinous layers between which and the flame retardant layer are sandwiched.

Furthermore, since the second welding member is welded in addition to the first welding member, the end faces of the at least one flame retardant sheet are bonded together more firmly.

Preferably, the welding of the first welding member is performed by a welding tool having an abutment face which is abutted against the first welding member, and at least an edge portion of the abutment face is chamfered.

Preferably, the bonding method further comprises a step of removing a portion pushed out from the clearance, before the second welding member is placed.

Preferably, the welding of the second welding member is performed by a welding tool configured to suppress a height of the second welding member melted and situated on the one face of the at least one sheet member.

Preferably, the flame retardant agent is a bromine-based agent.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

Figure 1:
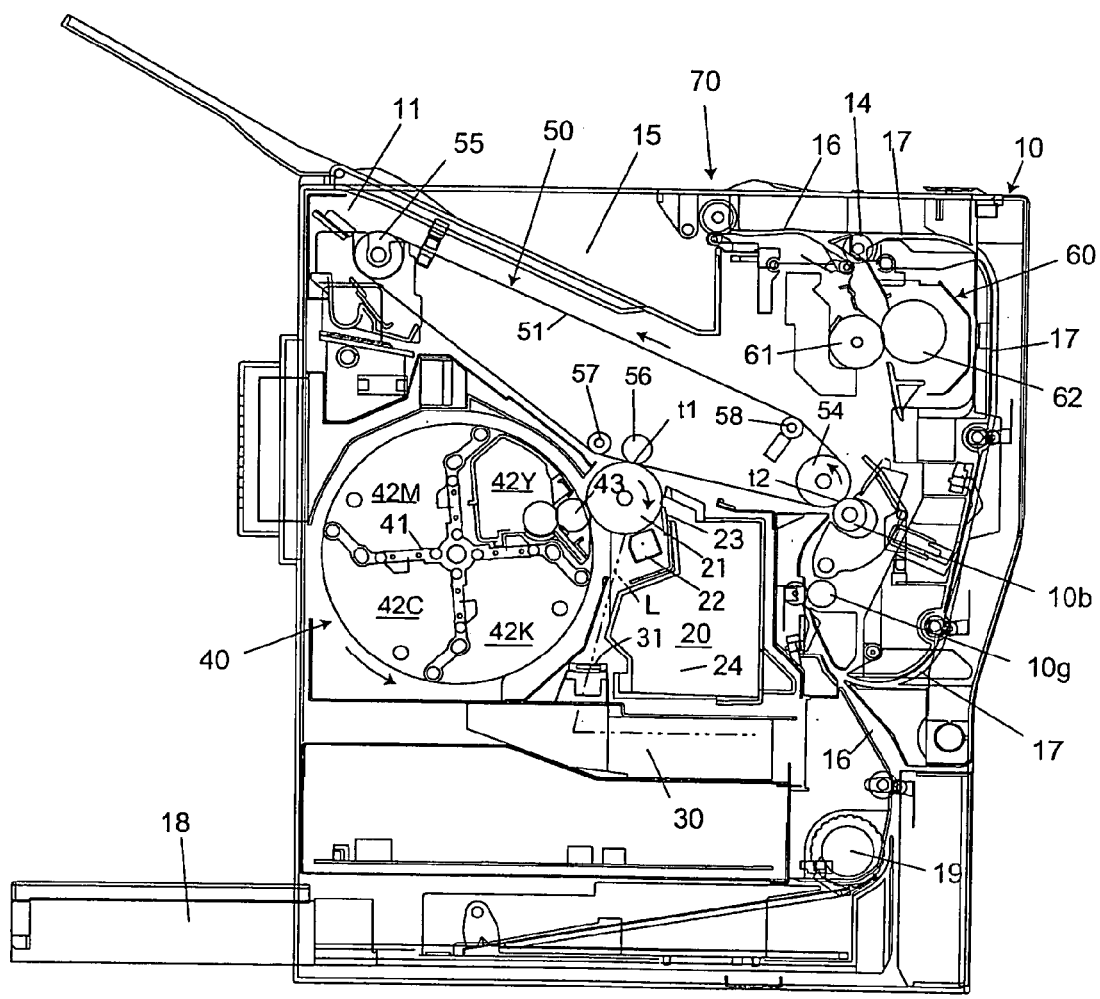
FIG. 1 is a schematic section view of an image forming apparatus incorporating an intermediate transfer member according to one embodiment of the invention.

FIG. 1 shows an internal structure of an image forming apparatus incorporating an intermediate transfer member according to one embodiment of the present invention.

This image forming apparatus is a color image forming apparatus capable of forming full color images on both surfaces of a recording medium such as paper of A3 size at the maximum. The image forming apparatus comprises: a case 10 accommodating an image forming section including an image carrier unit 20, an exposer unit 30, a developer unit 40, an intermediate transferer unit 50 and a fuser unit 60; a conveyance path 16 for conveying the paper having an image formed on its one side (or alternatively on both sides as described later) by the image forming section toward a paper discharging tray 15; and a return path 17 for reversing the orientation of the paper transported toward the paper discharging tray 15 such that the paper is sent back toward the image forming section, for forming an image on the other surface. Paper discharging rollers 70 are mounted ahead of the paper discharging tray 15. A frame (not shown) of the body of the apparatus is mounted in the case 10. The various units are mounted to the frame.

The image carrier unit 20 comprises an image carrier 21 having a photosensitive layer on its outer surface and a scorotron charger 22 for uniformly charging the outer surface of the image carrier 21. The outer surface of the image carrier 21 uniformly charged by the charger 22 is selectively exposed by laser light L from the exposer unit 30 to form an electrostatic latent image. Toner that is a developer agent is applied to the electrostatic latent image in the developer unit 40 to create a visible toner image. This toner image is temporarily transferred (primary transfer) to an intermediate transfer belt (one example of intermediate transfer member) 51 of the intermediate transferer unit 50 at a primary transfer position t1. Furthermore, the image is plenarily transferred (secondary transfer) to the paper at a secondary transfer position t2. The image carrier unit 20 has a cleaner (cleaning blade) 23 for removing toner remaining on the surface of the image carrier 21 after the primary transfer and a waste toner collector 24 for accommodating waste toner removed by the cleaner 23.

The conveyance path 16 and return path 17 are formed in the case 10. The conveyance path 16 is used to convey the paper from a paper feeding tray 18 (described later) to the secondary transfer position t2. An image is formed on one surface of the paper in the secondary transfer position t2.

The paper is transported toward the paper discharging tray 15 by the paper discharging rollers 70 on top of the case 10. The return path 17 is used to reverse the orientation of the paper that is being transferred toward the paper discharging rollers 70 and paper discharging tray 15 through the conveyance path 16. The paper is sent back toward the secondary transfer position t2 such that an image is to be formed on the other surface.

The paper feeding tray 18 in which plural sheets of paper are stacked and held and a paper feeding roller 19 for feeding the sheets of paper one by one toward the secondary transfer position t2 are mounted in a lower part of the case 10.

A gate roller 10g for controlling the feeding timing of paper to the secondary transfer position t2 is mounted in the route going from the conveyance path 16 and return path 17 to the secondary transfer position t2.

The developer unit 40 is a rotary type in which developer cartridges holding separate toners therein are replaceably mounted in a rotary body 41. In this embodiment, a developer cartridge 42Y for yellow, a developer cartridge 42M for magenta, a developer cartridge 42C for cyan, and a developer cartridge 42K for black are mounted. In the figure, only the developer cartridge 42Y for yellow is drawn specifically. The rotary body 41 rotates in steps of 90 degrees in the direction of the arrow to selectively bring a developing roller 43 into abutment with the image carrier 21. The surface of the image carrier 21 can be developed selectively.

The exposer unit 30 irradiates the image carrier 21 with the laser light L through an exposure window 31 made of a plate glass or the like.

The intermediate transferer unit 50 comprises a unit frame (not shown); a drive roller 54 rotatably held by the frame; a follower roller 55; a primary transfer roller 56; a guide roller 57 for stabilizing the status of the intermediate transfer belt 51 at the primary transfer position t1; and a tension roller 58. The intermediate transfer belt 51 is stretched by these rollers and circulated in the direction of the arrow in the figure. The primary transfer position t1 is formed between the image carrier 21 and primary transfer roller 56.

A secondary transfer roller 10b is mounted on the body side and retractably brought into contact with the drive roller 54 through the intermediate transfer belt 51 to form the secondary transfer position t2. When a color image is formed, plural colors of toner image are superimposed on the intermediate transfer belt 51 while the secondary transfer roller 10b is retracted from the intermediate transfer belt 51. Then, the secondary transfer roller 10b is abutted against the intermediate transfer belt 51 when the paper is supplied to the secondary transfer position t2, so that the color image (toner images) is transferred to the paper.

The paper to which the color image has been transferred passes through the abutted portion between a pair of fusing rollers 61 and 62 of the fuser unit 60. As a result, the toner image is melted and fixed on the paper. The paper is conveyed toward paper discharging tray 15 by a pair of conveyance rollers 14 and the paper discharging rollers 70.

Next, there will be described below a method of fabricating the intermediate transfer belt 51 with reference to FIGS. 2 to 7. Since this method is based on a method of bonding ends of a flame retardant sheet, the description for the fabricating method serves as the description for the bonding method.

Figure 2:
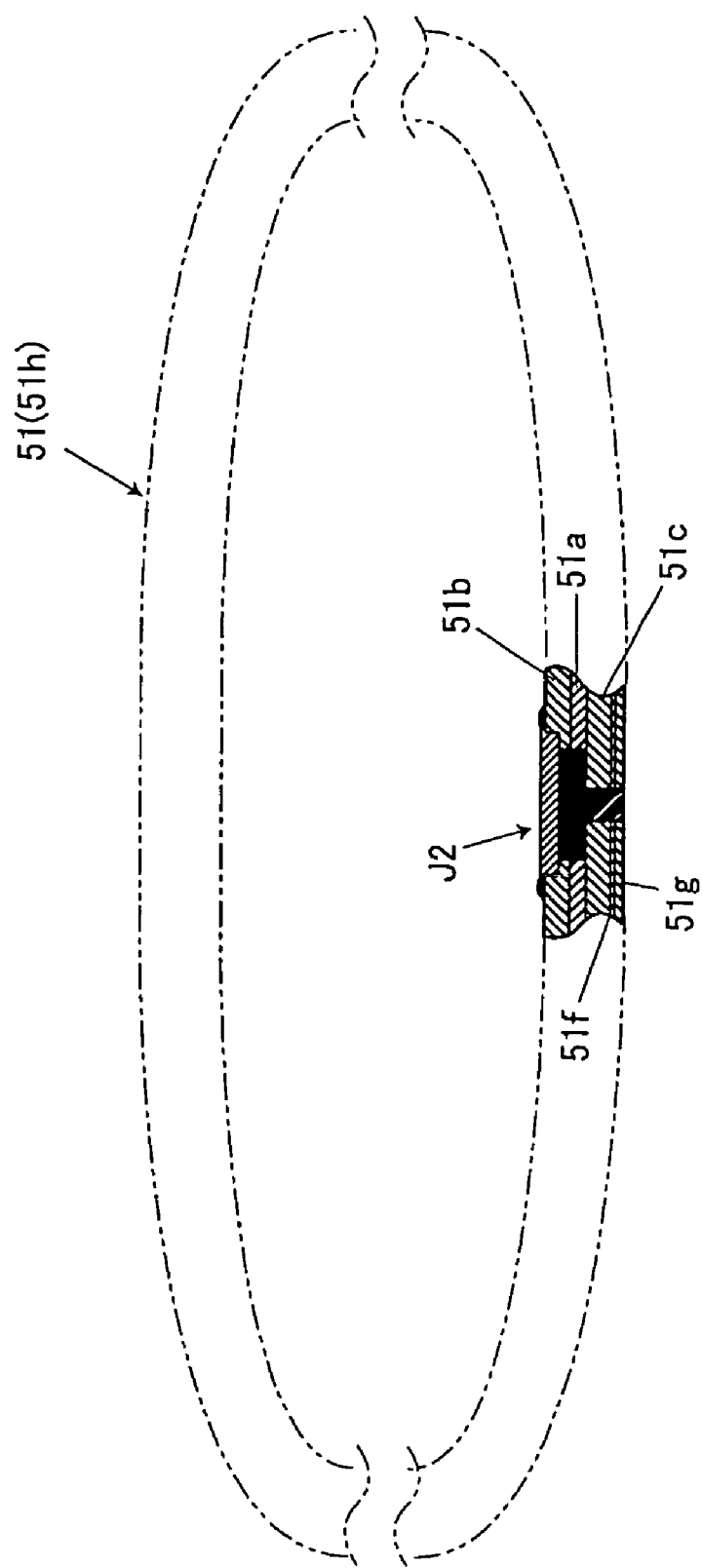
FIG. 2 is a schematic section view of a joint portion of the intermediate transfer member.
Figure 3:
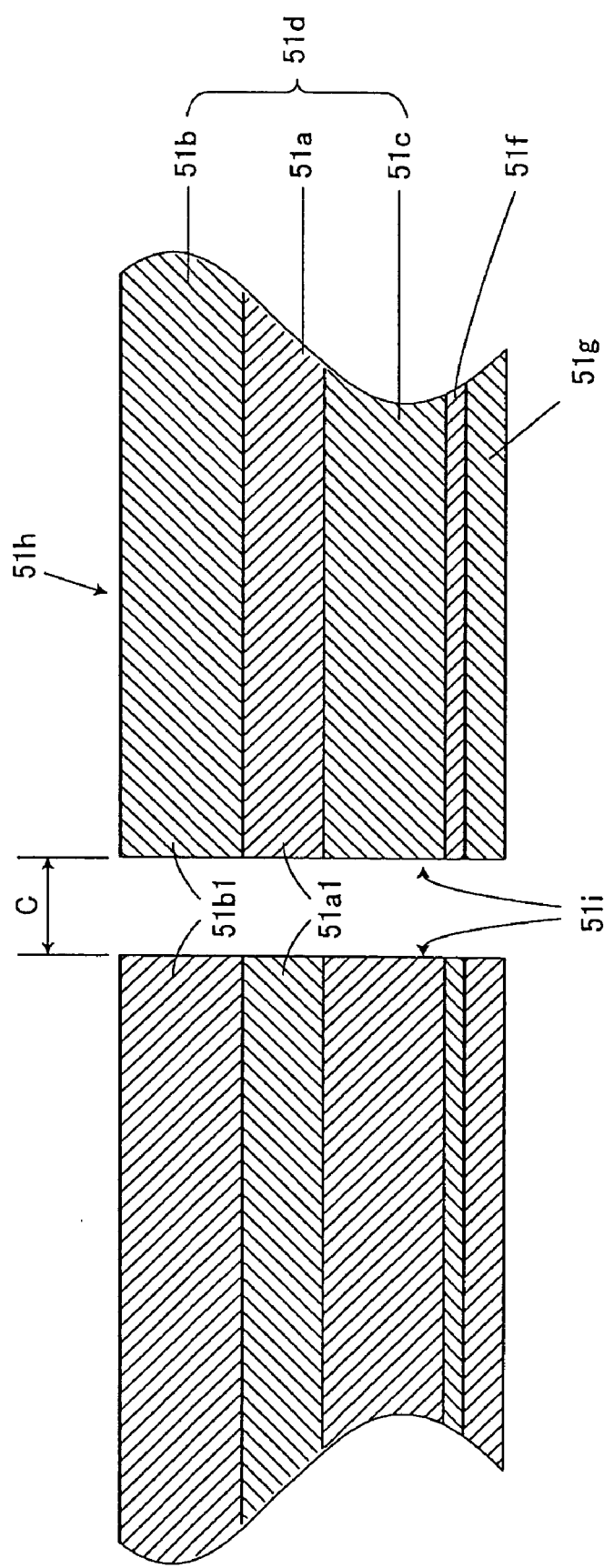
FIG. 3 is an enlarged section view of the joint portion, showing a state before welding is performed.

In order to obtain an endless intermediate transfer belt 51 shown in FIG. 2, there is first prepared a sheet member 51h wherein a conductive layer 51f and a resistive layer 51g are laminated on one side surface of a substrate sheet 51d in which a fire retardant layer 51a having extinguishability is sandwiched between resinous layers 51b and 51c. Then, both end faces 51i of the sheet member 51h are opposed to each other while forming a clearance C therebetween.

Since the intermediate transfer belt 51 is fabricated from plural layers, optimum materials can be selected for the respective layers.

For example, the flame retardant layer 51a is made of a bromine-based flame retardant agent such as hexabromobenzene (HBB).

Resinous film having high elasticity and bending resistance is used as the resinous layers 51b and 51c. This secures durability. Also, peripheral length variations due to fluctuation of load applied thereto can be suppressed. In particular, film of synthetic resin made of polyethylene terephthalate, for example, is used.

The conductive layer 51f is formed by depositing metal on the surface of the resinous layer 51c.

The resistive layer 51g can be formed, for example, by applying a resinous solution in which conductive particles are dispersed onto the conductive layer 51f and hardening and drying the laminate.

When the intermediate transfer belt 51 is incorporated in the image forming apparatus as described above and an image formation is performed, a transfer bias is applied to the conductive layer 51f. The toner image is transferred to the surface of the resistive layer (moderate resistive layer) 5g from the image carrier 21.

Figure 4A:
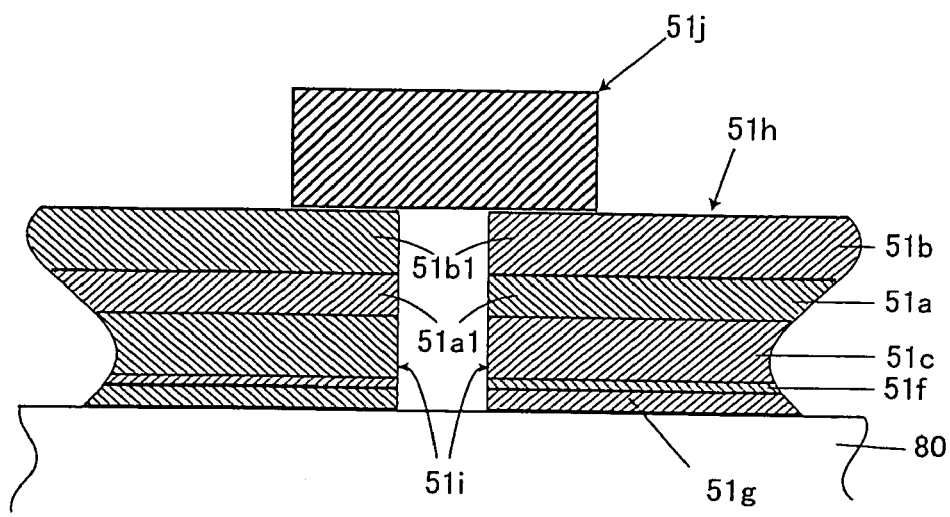
FIGS. 4A and 4B are enlarged section views of the joint portion, showing a state that a first welding is performed.

As shown in FIG. 4A, on a flat heatproof table 80, both end faces 51i of the sheet 51h are placed opposite to each other with the clearance C between them. A tape-shaped first welding member 51j having a first width (e.g., about 3 mm) is attached so that it bridges across (covers) the clearance C. The first welding member 51j is made of the same material as that (e.g., polyethylene terephthalate) of the resinous layers 51b and 51c.

Figure 4B:
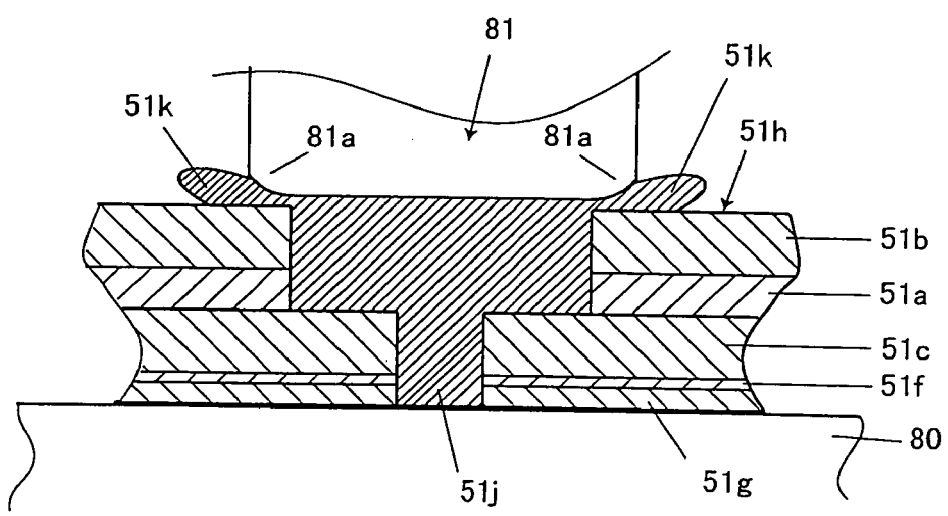

As shown in FIG. 4B, a first welding tool (e.g., ultrasonic horn) 81 is placed at a side to be an inner side of the endless intermediate transfer belt 51, such that the first welding member 51j and sheet 51h are sandwiched between the first welding tool 81 and table 80. Then, the first welding tool 81 is moved in the longitudinal direction of the first welding member 51j (orthogonal to the sheet surface of this figure and along the longitudinal direction of the clearance C). The melted first welding member 51j is pushed into the clearance C. In this way, the both end faces 51i of the sheet 51h are welded together.

Figure 5A:
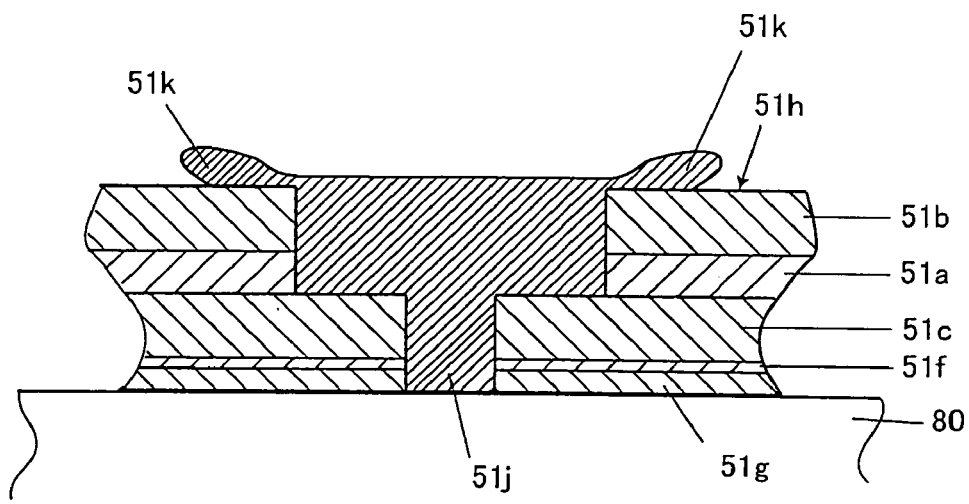
FIGS. 5A and 5B are enlarged section views of the joint portion, showing a state after the first welding is performed.

Incidentally, on the side of the first welding tool 81, the end portions 51b1 of the resinous layer 51b and the end portions 51a1 of the flame retardant layer 51a are melted together with the first welding member 51j. These are mixed together to form a first joint portion J1. Superfluous parts 51k of this mixture which are not within the clearance C jut out like burrs from between each end portion 81a of the first welding tool 81 and the surface of the sheet 51h. In other words, a member having a volume greater than the volume of the clearance C is used as the first welding member 51j. FIG. 5A shows a state after the first welding process is performed.

To facilitate the formation of the superfluous portions 51k, at least edges 81a of the abutment face of the welding tool 81 are rounded. A tool having a semispherical abutment face may be used as the first welding tool 81.

With this configuration, the flame retardant agent in the vicinity of the first joint portion J1 can be smoothly pushed out, so that a more firm bonded state of the joint is obtained.

Figure 5B:
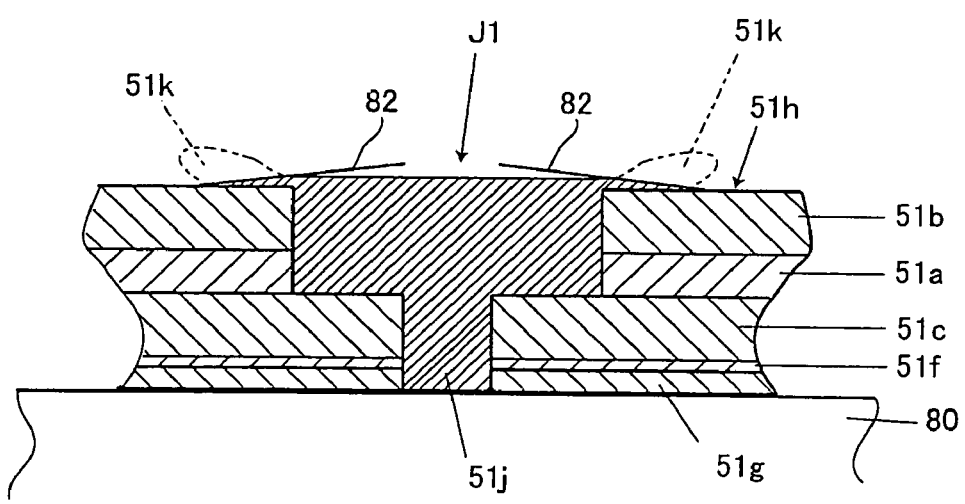

As shown in FIG. 5B, a cut-off tool (e.g., a razor-edged cutter) 82 is moved orthogonal to the sheet surface of this figure to cut off the superfluous portions 51k (i.e., the flame retardant agent that is the mixture pushed out to both sides of the first joint portion J1).

Figure 6A:
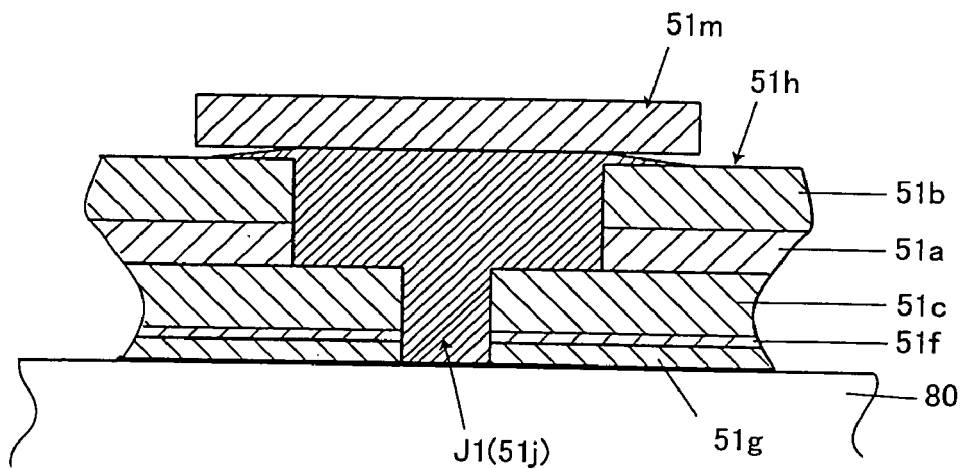
FIGS. 6A and 6B are enlarged section views of the joint portion, showing a state that a second welding is performed.

As shown in FIG. 6A, a tape-shaped second welding member 51m having a second width larger than the first width (e.g., about 5 mm) is attached so as to close off the first joint portion J1. The second welding member 51m is made of the same material (e.g., polyethylene terephthalate) as the resinous layer 51b.

Figure 6B:
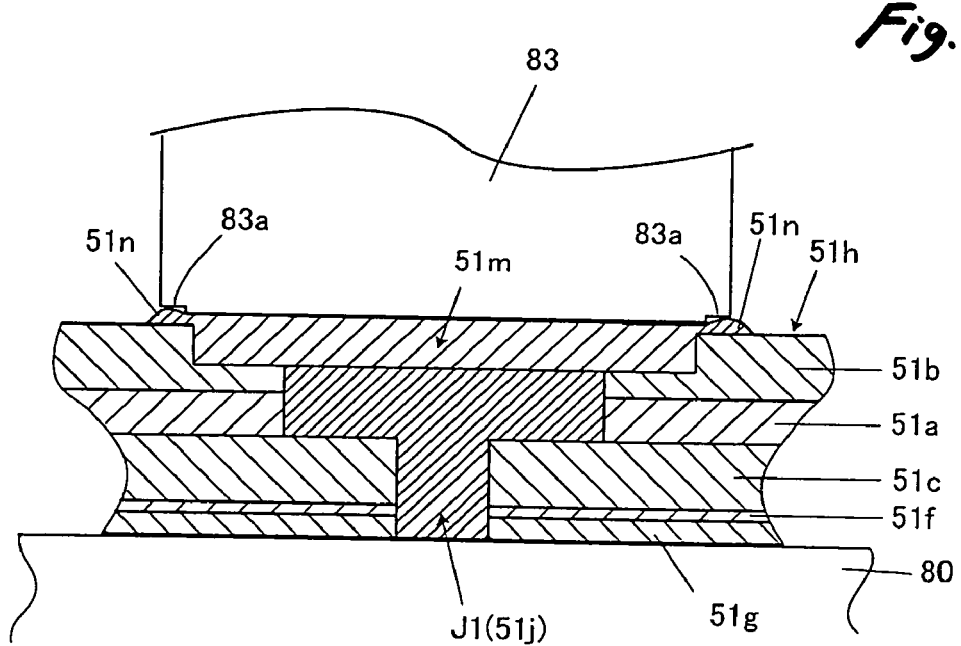

As shown in FIG. 6B, a second welding tool 83 (e.g., ultrasonic horn) is placed such that the second welding member 51m and the first joint portion J1 are held between the second welding tool 83 and table 80. The second welding tool 83 is moved in the longitudinal direction (orthogonal to the sheet surface of this figure and along the longitudinal direction of the first joint portion J1) of the second welding member 51m. Accordingly, the second welding member 51m is melted and partially pushed into the first joint portion J1.

Incidentally, on the side of the second welding tool 83, the end portion 51b2 (see FIG. 6A) of the resinous layer 51b and the aforementioned mixture are partially melted together with the second welding member 51m. As a result, a second joint portion J2 is created. Superfluous portions 51n containing the flame retardant agent jut out from between each end portion 83a of the second welding tool 83 and the surface of the sheet 51h.

Figure 7:
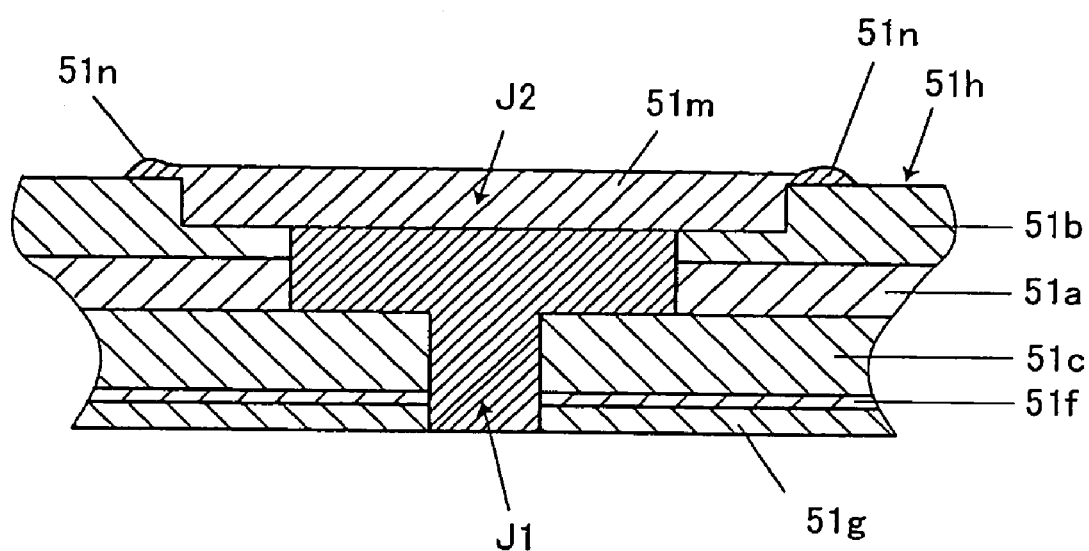
FIG. 7 is an enlarged section view of the joint portion, showing a state after the second welding is performed.

FIG. 7 shows a state after the second welding process is performed. Since the superfluous portions 51k pushed out to both sides of the first joint portion J1 is removed after the first welding process, the height of the superfluous portions 51n pushed out to both sides of the second joint portion J2 during the second welding process can be reduced.

To prevent the jutting superfluous portions 51n from protruding like burrs, burr-suppressing portions (hold-down portions) 83a are formed on edges of the second welding tool 83 in a stepwise manner. Their shape may be appropriately modified. For example, the corner of the stepwise portion may be curved.

With this configuration, a less uneven joint can be obtained. This dispenses with the process for removing superfluous portions (burrs). Furthermore, smooth operation of the belt can be achieved.

According to the fabricating method as described the above, during the first welding process, the flame retardant agent 51a1 situated in the vicinities of the end faces 51i of the sheet 51h and having no adhesiveness is pushed out. The end faces 51i of the sheet 51h are bonded together by the first welding member 51j and the resinous layers 51b and 51c between which and the flame retardant layer 51a are sandwiched.

Furthermore, after the first welding process, the relatively wide second welding member 51m is made to abut against the first joint portion J1, and then the second welding process is performed. Therefore, the end portions of the sheet 51h are bonded together more firmly.

Therefore, according to this method, an endless and non-flammable intermediate transfer member can be obtained. Specifically, an endless intermediate transfer member having a flame retardant class of UL 94 VTM-0 or better can be obtained.

As a result, it is not necessary to provide a non-flammable cover member for covering the intermediate transfer member. The installation space in the intermediate transfer member can be reduced accordingly. Hence, the whole image forming apparatus can be downsized.

Moreover, since the welding members 51j and 51m are made of the same material as that of the resinous layers 51b and 51c, the strength of the joint is improved.

Preferably, the clearance C is set to 50 to 250 μm for the following reasons. In such a configuration, the melted welding member can be flatly solidified on the surface of the intermediate transfer member so that the resistive layer 51g can be fixed on the surface of the sheet member 51h. As a result, peeling of the resistive layer 51g can be prevented during the operation of the intermediate transfer belt 51.

Figure 8A:
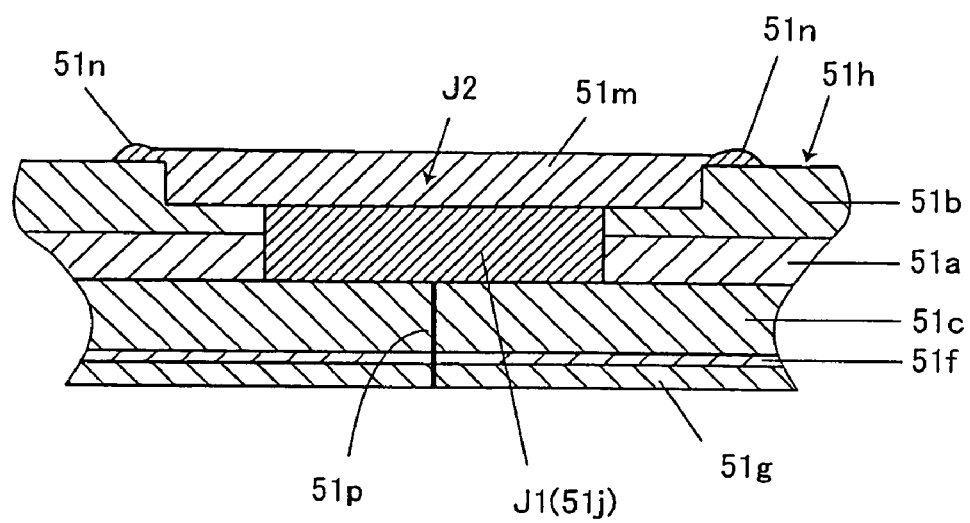
FIGS. 8A and 8B are enlarged section views of a joint portion of an intermediate transfer member according to a comparative example.
Figure 8B:
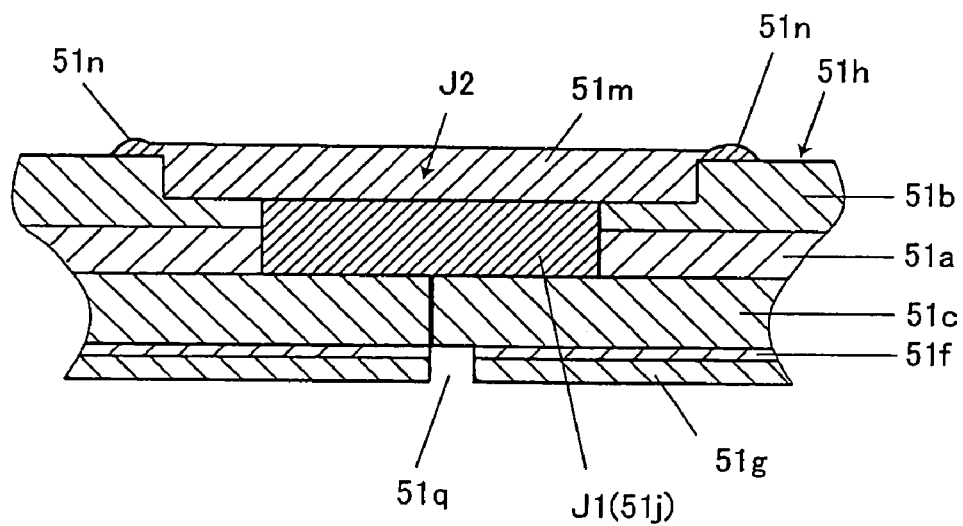

If the welding is performed without providing a clearance C between both end faces 51i of a sheet member 51h as shown in FIG. 8A, almost no bonding strength is obtained on the joint surface 51p between the end portions of the resinous layer 51c, conductive layer 51f, and resistive layer 51g (especially, the bonding strength between the end portions of the conductive layer 51f and resistive layer 51g). Therefore, after some number of image formations are performed, a gap 51q may be formed between the ends of the conductive layer 51f and resistive layer 51g as shown in FIG. 8B.

In contrast, according to the invention, the welding member 51j enters the clearance C, and the end portions of the resinous layer 51c, conductive layer 51f, and resistive layer 51g are bonded together firmly. Therefore, the above problem will not be occurred.

While embodiments of the invention have been described so far, the present invention is not limited to the above embodiments. The invention can be practiced with appropriate modifications within the scope delineated by the gist of the invention. For example, plural flame retardant layers may be provided. The flame retardant layer may be made of plural different kinds of flame retardant agents which exhibit extinguishability when mixed.

What is claimed is:

1. A method of fabricating an endless intermediate transfer member incorporated in an image forming member such that a toner image developed on an image carrier is temporarily transferred thereon, the method comprising steps of:
    preparing a substrate sheet in which a flame retardant layer comprised of a flame retardant agent having extinguishability is sandwiched between resinous layers;
    laminating a conductive layer on a first face of the substrate sheet, and laminating a resistive layer on the conductive layer to form a sheet member;
    opposing both end face of the sheet member while forming a clearance therebetween;
    placing a first welding member having a first width larger than a width of the clearance, on a second face of the substrate sheet; and
    welding the first welding member with the end faces of the sheet member such that the first welding member is melted and pushed into the clearance while the flame retardant agent situated in the vicinity of the end faces is pushed out from the clearance, thereby forming a joint portion.

2. The fabricating method as set forth in claim 1, further comprising steps of:
    placing a second welding member having a second width larger than the first width, on the joint portion; and
    welding the second welding member with the substrate sheet.

3. The fabricating method as set forth in claim 1, wherein the welding of the first welding member is performed by a welding tool having an abutment face which is abutted against the first welding member, and at least an edge portion of the abutment face is chamfered.

4. The fabricating method as set forth in claim 2, further comprising a step of removing a portion pushed out from the clearance, before the second welding member is placed.

5. The fabricating method as set forth in claim 2, wherein the welding of the second welding member is performed by a welding tool configured to suppress a height of the second welding member melted and situated on the second face of the sheet member.

6. The fabricating method as set forth in claim 1, wherein the first welding member is composed of a material forming the resinous layers.

7. The fabricating method as set forth in claim 2, wherein the second welding member is composed of a material forming the resinous layers.

8. The fabricating method as set forth in claim 1, wherein the flame retardant agent is a bromine-based agent.

9. The fabricating method as set forth in claim 1, wherein the second face of the substrate sheet member is to be an inner face of the endless intermediate transfer member.

* * * * *